May 8, 1956 J. GRILLO 2,745,090
BATTERY CELL VOLTAGE COMPARISON SYSTEM
Filed July 24, 1952 2 Sheets-Sheet 1

INVENTOR.
JOSEPH GRILLO
BY Frank A. Bower
ATTORNEY

May 8, 1956 J. GRILLO 2,745,090
BATTERY CELL VOLTAGE COMPARISON SYSTEM
Filed July 24, 1952 2 Sheets-Sheet 2

INVENTOR.
JOSEPH GRILLO
BY Frank W. Bower
ATTORNEY

United States Patent Office 2,745,090
Patented May 8, 1956

2,745,090

BATTERY CELL VOLTAGE COMPARISON SYSTEM

Joseph Grillo, New York, N. Y., assignor to Ward Leonard Electric Company, a corporation of New York Application July 24, 1952, Serial No. 300,686

5 Claims. (Cl. 340—253)

This invention relates to electrical systems, and is applicable particularly to the indication by a single means of the condition of any one of a plurality of electrical devices in relation to a standard. This invention is useful with electrical devices such as batteries, thermocouples, etc.

In various instances, wherein a group or bank of batteries are used, it is often desirable to have a continuous check of the voltage of each battery. In certain types of equipment, the operating voltage of all the batteries should be above a permissible minimum voltage. When a battery drops to this voltage, it is desirable to have an immediate indication of this condition. The departure of a battery from the operating range may require a discontinuance or a reduction of the current drain. This is particularly true in the case of submarine batteries, where any battery that becomes fully discharged absorbs energy, so that it is likely to reverse its polarity and create dangerous conditions. These batteries should not fall below a predetermined minimum voltage. This should be above the voltage of a fully discharged cell so that sufficient warning is given to permit the reduction of the current drain on the batteries or a recharging of the battery. It is preferable to indicate the dropping of the cell voltage by a single indicating means. The indicating means or lamp would be located at a main panel in view of the operating personnel. This would provide a continuous indication of the condition of the batteries and would light a signal when a battery was below the required voltage.

An object of this invention is to provide an electrical system with an indicating means that is sensitive to a change in the relationship of an electrical device to a given standard.

Another object of the invention is to provide an electrical system that continuously and separately monitors each current or voltage source of a group of sources.

Another object of the invention is to provide an electrical circuit that continually checks the voltage of a single cell of a group of cells and automatically and instantaneously indicates when the voltage of a cell drops below a permissible minimum.

Another object of the invention is to provide a voltage monitoring system that has a general indication and a specific indication of a low voltage cell.

Figure 1:
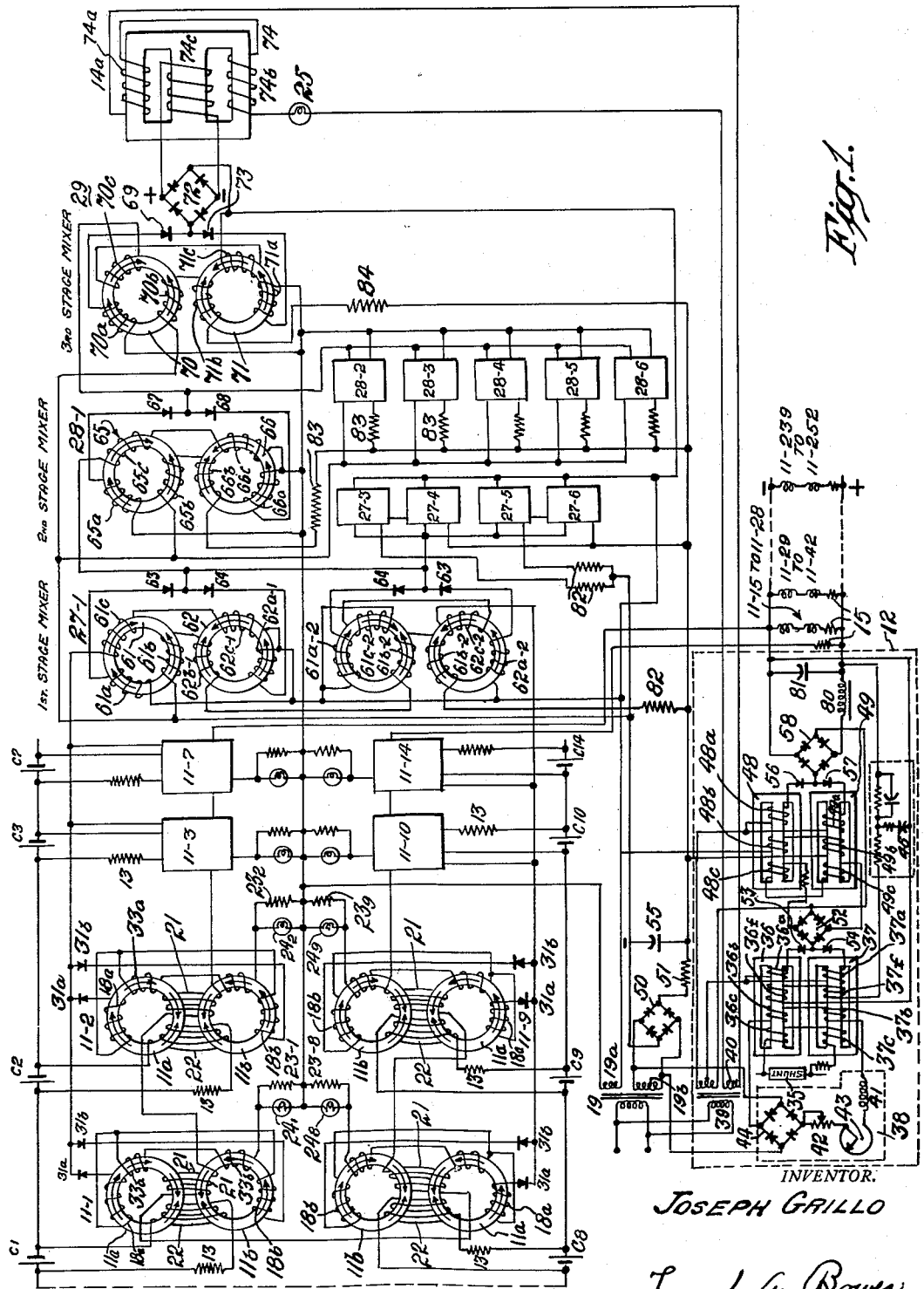
Figure 2:
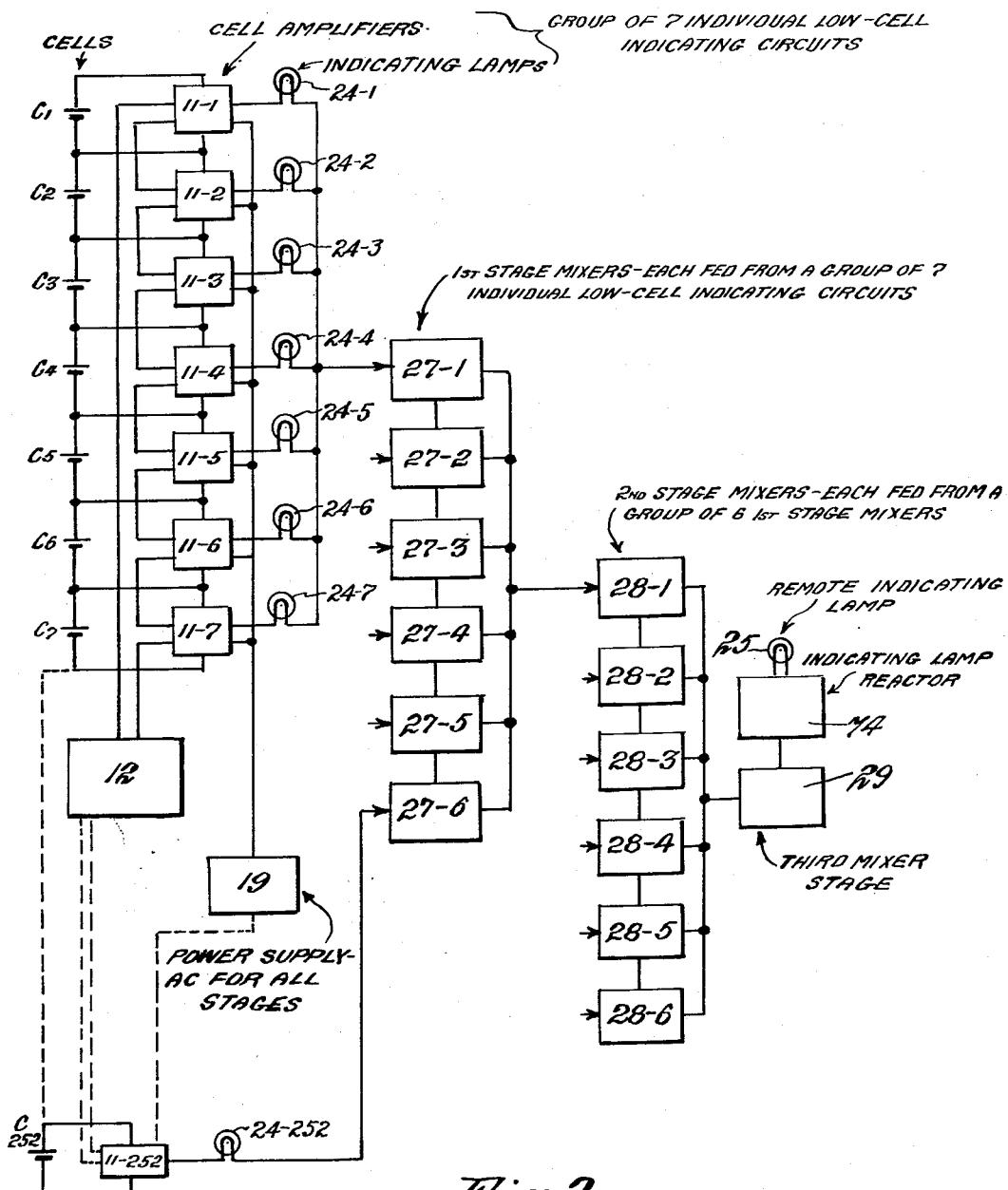

Other and further objects and advantages of the invention will be apparent from the following description, taken in connection with the accompanying drawings, in which Fig. 1 is a diagrammatic illustration of a typical system; and Fig. 2 is a schematic diagram of the system.

In the case of banks of batteries, it is desirable to operate each cell at or above a given minimum voltage, determined by various operating criteria not discussed herein. This minimum operating voltage is between a maximum operating voltage of a fully charged cell and a minimum operating voltage of a discharged cell. The value of these voltages decreases the load current increases. As the load current increases the voltage of the cell proportionally decreases. A given minimum operating voltage may be from 1.74 volts for zero current drain to 1.47 volts for full load current. Under a current drain, the voltage of each cell is preferably kept above this given voltage limit. If a cell drops to this limit, the batteries may be recharged, or, if continued use of the batteries is required, the current drain may be reduced. The particular purpose of this embodiment is to provide an indication when any one of the cells drops to this predetermined minimum voltage.

The voltage of each cell is compared with a given standard in magnetic amplifiers 11 associated with each cell. When the voltage drops to the specified minimum voltage, the output of the magnetic amplifier increases greatly and the lamps light.

There are 252 cell amplifiers, 11-1 to 11-252, each connected across the terminals of cells C-1 to C-252 respectively. The outputs of the cell amplifiers respond to critical changes in the voltages of the cells. When the voltage of a particular cell drops below a permissible minimum voltage, the output current of the cell increases and lights the individual indicating lamp 24 and the general indicating lamp 25. The general indicating lamp is connected to the outputs of the cell amplifiers 11 by means of the first stage mixers 27, second stage mixers 28, third stage mixer 29 and the reactor 74.

The cell amplifiers 11-1 to 11-252 are connected in groups of seven to the mixers 27-1 to 27-36. In Fig. 1 the first group of seven cell amplifiers 11-1 to 11-7 are shown connected to mixer 27-1. The mixers 27-1 to 27-36 are in turn connected in groups of six to the second stage mixers 28-1 to 28-6. The mixers 28-1 to 28-6 are connected to the last or third stage mixer 29.

The output current of each magnetic amplifier 11 is controlled by a comparison of the flux of the current from the respective cell and the flux of the reference current from the reference circuit 12. The output of the cell amplifier remains at a negligible value until the current from the cell drops in relation to the current from the reference circuit. When this critical relation occurs, a further reduction causes the output of the cell amplifiers to increase from a negligible value to a substantial value. The increased output raises the output in the successive mixers and lights the lamp 25. The bias winding 21 and the control winding 22 of the cell amplifier create opposing fluxes in the respective cores. The bias winding flux is additive to the flux of the anode windings and the flux of the control winding opposes the flux of the anode winding.

The reference circuit 12 provides a current that varies proportionally with the changes of the cell voltage due to load current so that the standard set by the reference circuit will correspond to the predetermined operating limit. The reference current is supplied to the bias windings 21 of the magnetic amplifiers 11. The bias windings 21 of the group of magnetic amplifiers 11-1 to 11-7 are connected in series with the bias windings of the group of amplifiers 11-8 to 11-14 to form a bias circuit loop. There are eighteen of these loops supplied with current by the reference circuit.

The magnetic amplifiers 11 comprise two saturable reactors 11a, 11b of the toroidal type. 18a, 18b are wound on the cores of the reactors 11a, 11b respectively and are connected in series with the rectifiers 31a, 31b respectively to provide an alternating output current from the magnetic amplifier 11. The feedback windings 33a, 33b are separately wound on the respective cores and are connected in series with each other and the anode windings 18a, 18b. The individual indicator lamps are connected in series with the anode circuit, and pass the current through the anode windings. By-pass resistors 23–1 to 23–252 are connected in parallel with lamps 24–1 to 24–252 to provide a second passage for the anode current, so that, if a lamp 24 fails, the general indicator lamp 25 will still light.

The currents in the control winding and the bias winding are set at such a value that voltages of the cell above the set minimum will render the reactors 11a, 11b unsaturated. The flux of the bias winding saturates the reactors while the flux of the control winding opposes and cancels the flux of the bias winding to render the reactors unsaturated, as long as the cell voltage is above the set minimum. The value of the control current at which the reactors shift from unsaturated to saturated is set by the adjustment of the rheostat 43 and the voltage drop of the shunt 35. This shift from unsaturated to saturated condition is set to occur when the cell voltage reaches the desired minimum value. The rheostat 43 determines the minimum operating level and the shunt 35 varies the flux of the bias winding with the changes in the load current. The anode current through the feedback windings 33a, 33b creates a flux additive to the flux of the anode windings 18a, 18b respectively. The feedback windings increase the slope of the saturation curve of the reactors 11a, 11b so that a slight change in the control flux will shift the reactors from an unsaturated condition to a saturated condition. This feedback current may be set so that a change of 25 millivolts in the cell voltage at the minimum limit will cause the necessary flux change.

The group of amplifiers 11–1 through 11–7 have their outputs connected to the mixer 27–1, and the group of amplifiers 11–8 to 11–14 have their outputs connected to the mixer 27–2. The other groups of amplifiers are similarly connected to a mixer. Each of the outputs of the amplifiers is connected directly to the control winding of the respective mixers so that each amplifier delivers current to the control winding without interfering with the other amplifiers of the same group.

The first mixer stage comprises thirty-six magnetic amplifiers. Each amplifier comprises two toroidal type saturable reactors 61, 62 with anode windings 61a, 62a respectively. The bias winding 61b, 62b are connected in series with resistor 82 across a bias supply which consists of a rectifier 50, adjusting resistor 51, and filter capacitor 55, and provides a flux that holds the output current of the mixer to a zero or a negligible value when there is no signal impressed on the control windings 61c and 62c. The control windings are connected in series, and receive the output current from the amplifiers 11. The output current passes alternately through the anode windings 61a and rectifier 63 in series and the anode winding 62a and rectifier 64 in series. Thus an alternating current is impressed on the succeeding mixer stage.

The second stage mixers are similar to the first stage mixers and each comprise two saturable reactors 65, 66 of the toroidal type with anode windings 65a, 66a, bias windings 65b, 66b, and control windings 65c, 66c. The control windings 65c, 66c of each mixer are connected to the outputs of a group of six first stage mixers, and receive an alternating current therefrom. As long as the output currents of the preceding mixers of the group are negligible, the bias windings 65b, 66b maintain the output current of the anode windings at an ineffective value. The anode windings 65a, 66b supply an alternating output current through the rectifiers 67, 68 to the third or last stage mixer 29. The six mixers of the second stage are each connected to the mixer 29. All the signals from the amplifiers 11 pass through this last stage. The mixer 29 also has two saturable reactors 70, 71 with anode windings 70a, 71a, and control winding 70c, 71c. The bias windings 70b, 71b are supplied with current from the bias rectifier 50 through resistor 84 to hold the output to a value that does not cause the lamp 25 to light under no-signal conditions. The control windings 70c, 71c are connected to the outputs of the six preceding mixers, and, on application of a signal, the alternating output current in the anode windings 70a, 71a and the rectifiers 69, 73 in series respectively increases. The rectifier 72 rectifies this alternating output and impresses a direct current on the control winding 74c of the reactor 74 that lowers the impedance of the reactor and increases the current through the windings 74a, 74b. The windings 74a, 74b are in series with each other and the lamp 25, and are supplied with current from the transformer winding 40.

The bias windings of each stage are supplied with biasing current from the rectifier 50 connected to the transformer 19, and the anode windings are supplied from the secondary 19a of the transformer 19.

Thus it is seen that the signals from the cell amplifiers are cascaded down so that the signal from any amplifier is passed through a single control or indicator.

The reference circuit 12 comprises a level adjustment circuit 38 and a compensating circuit 39. The level adjustment circuit comprises a rectifier 44 rectifying the alternating current from the secondary winding 19b an adjusting rheostat 43, a dropping resistor 42, and filter reactor 41, and provides an operating current level. The compensating circuit 12 includes the shunt 35 to provide a current which varies with changes in the load current. The level adjustment current and the compensating current are combined in the first stage of the reference circuit 12 to control the reference current in accordance with the amount of load current and the desired operating level. The first stage comprises a pair of saturable reactors 36, 37 having anode windings 36a, 37a, bias windings 36b, 37b, control windings 36c, 37c and feedback windings 36f, 37f. The operating level adjustment circuit and the compensating circuit are connected to the bias windings and control windings respectively. The bias windings are connected in series with each other and also in series with the rheostat 43, and choke 41. The output of rectifier 44 is connected across the bias windings, the rheostat 43, and the choke 41. The rheostat 43 sets the minimum operating level of the cells. The control windings 36c, 37c are connected in series across the shunt 35, and the current through the control windings varies the output current with the changes in load current. The anode windings 36a, 37a are connected in series with rectifiers 53, 54 respectively to provide an alternating output current. The rectifier 52 rectifies this output and presents a direct current to the second stage magnetic amplifier. The second stage comprises a pair of saturable reactors 48, 49 having anode windings 48a, 49a, bias windings 48b, 49b, and control windings 48c, 49c. The rectifier 52 is connected to the control windings 48c, 49c in series, and impresses a direct current on the windings that controls the output or reference current.

The bias windings 48b and 49b are connected to the bias rectifier 50 and set the second stage reactors at the proper operating range. The anode windings 48a, 49a are supplied with alternating current from the transformer 39 and are in series with rectifiers 56, 57. The output current is rectified by the rectifier 58, is filtered by reactor 80 and capacitor 81, and impressed on the eighteen bias circuits of amplifiers 11 as a reference current. Resistors 15 are calibrating resistors in series with the 18 cell amplifier bias circuits. The voltage across the resistors in series with the bias windings is measured to determine the value of the reference current. The voltage across the bias circuits is fed back to the feedback windings 36f, 37f of the first stage through compensating network 46. This feedback increases the linearity of the reference circuit and its accuracy of operation. The compensating network 46 is connected in the feedback circuit and provides for stability of operation of the reference circuit.

The ratio of the resistance of resistors 13 and 15, which have negligible temperature coefficients, to the resistance of the windings in series with them is kept constant, so that the operating level does not shift with temperature.

Although this embodiment has been described in connection with battery cells it also can be readily adapted to indicate the electrical condition of other current or voltage devices such as thermocouples or the like. The amplifiers 11 could be connected to a plurality of thermocouples located at spaced points or at a central location. The current from the thermocouple actuates the amplifier and causes an indication at the lamps 24, 25. The rheostat 43 would set the range of operation of the thermocouple, depending on the circuit arrangements. The shunt 35 would be dispensed with.

Although a particular embodiment of the invention has been described, various modifications and various applications of the invention may be made without departing from the scope thereof.

I claim:

1. An electrical system for monitoring a plurality of electrical devices comprising a plurality of separate magnetic amplifiers each directly connected to a different electrical device to receive a monitoring current from a respective electrical device, a reference circuit directly connected to each of said magnetic amplifiers and providing a reference current on comparison with said monitoring current in said magnetic amplifiers producing a flux differential maintaining a non-activating output on an approved relationship producing an activating output on occurrence of a predetermined unapproved relation between said currents, a set of mixer amplifiers with each mixer amplifier connected to a separate group of said magnetic amplifiers, a second set of mixer amplifiers with each second mixer amplifier connected to a separate group of said first mixer amplifiers, said first and second mixers combining the outputs of said magnetic amplifiers for actuation of a general indicator on occurrence of the predetermined relationship in any magnetic amplifier.

2. An electrical system for monitoring each cell voltage of a plurality of cells connected in series comprising a plurality of saturable reactors each having a control winding, a bias winding and anode winding, means for connecting each control winding across a respective cell to receive a monitoring current directly therefrom to create a flux in said respective reactor proportional to the cell voltage said bias windings connected in series, a reference circuit having an output connected across said series connected bias windings to supply a bias current varying inversely to the output load current of the cells, said bias windings creating a flux in opposition to the flux of the control winding so that when the control voltage drops below a critical voltage the impedance of the anode windings is sharply reduced and the output current increases for actuating an indication means.

3. An electrical system as described in claim 2 wherein said saturable reactor has a feedback winding connected in series with the anode winding to increase the slope of the saturation curve so that a small change in the cell voltage at the critical voltage will reduce the impedance of the anode windings.

4. An electrical system as described in claim 2 wherein said reference circuit has a saturable reactor with anode windings, a control winding and a bias winding, said control winding adapted to be connected in parallel to one of the output lines of the cells to receive a small portion of the output current, said small portion of the output current creating a flux in opposition to the flux of the anode winding, said bias winding adapted to be supplied with a direct current, and a rheostat connected in series with said bias winding to set the reactor in the desired operating range.

5. A voltage monitoring system for providing a constant check of each cell voltage of a group of cells comprising a separate reference circuit connected to one of the output lines of the cells to vary the output current of said circuit inversely to the output current of the group of cells, a group of saturable reactors corresponding to the group of cells each saturable reactor having a bias winding, a control winding and an anode winding, said control winding connected across the cell to impress a voltage on the winding and create a flux to increase the impedance of the anode winding, said bias winding supplied with current from said output of the reference circuit to provide a current opposing said control flux and decreasing the impedance of the anode winding, means for connecting said saturable reactors in groups including means for connecting the anode windings of a group in parallel, mixers of a first stage having the outputs connected in parallel, second stage mixers each connected to the parallel outputs of a group, said second stage mixers having outputs connected in parallel to combine the outputs of the preceding mixers, a third stage mixer connected to the said parallel second stage outputs to pass all indications from the saturable reactor, indicating means connected to the output at said third stage mixer and controlled by said saturable reactors to provide an indication when any one of said cells drops below a minimum voltage.

References Cited in the file of this patent

UNITED STATES PATENTS

| | | |
|---|---|---|
| 2,547,011 | Jacobsen | Apr. 3, 1951 |
| 2,613,248 | Christie | Oct. 7, 1952 |
| 2,640,098 | Grillo | May 26, 1953 |